C. A. JUENGST.
INTERNAL COMBUSTION ENGINE.
APPLICATION FILED MAR. 13, 1915.
1,240,980.
Patented Sept. 25, 1917.
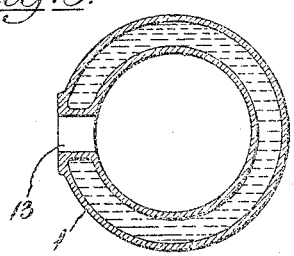
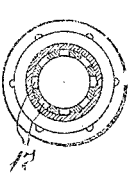
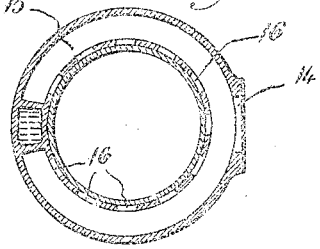
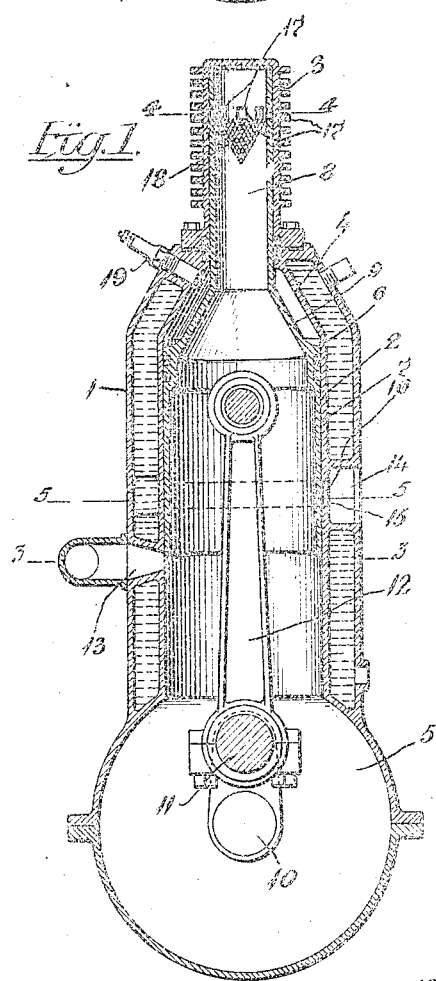
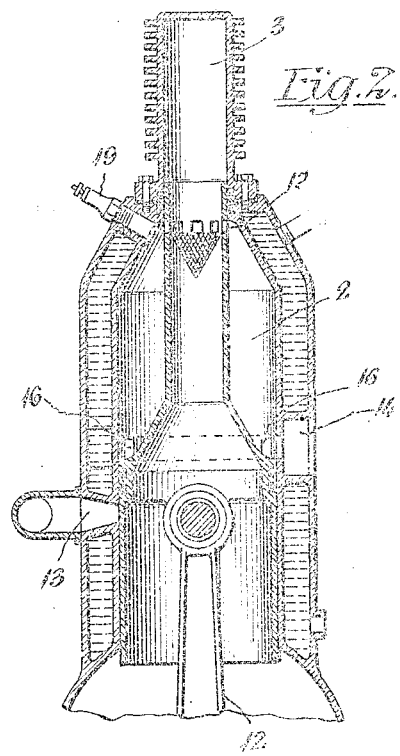
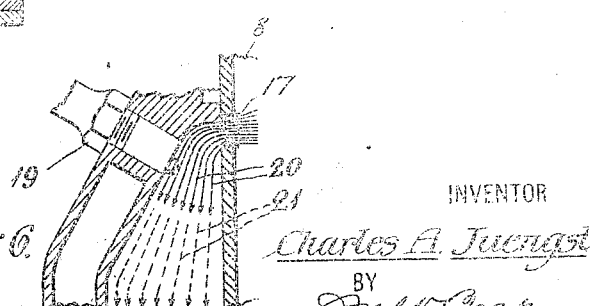
WITNESSES:
INVENTOR
Charles A. Juengst
BY
ATTORNEY

UNITED STATES PATENT OFFICE.

CHARLES A. JUENGST, OF CROTON FALLS, NEW YORK.

INTERNAL-COMBUSTION ENGINE.

1,240,980.                     Specification of Letters Patent.     Patented Sept. 25, 1917.

Application filed March 13, 1915. Serial No. 14,062.

*To all whom it may concern:*

Be it known that I, CHARLES A. JUENGST, a citizen of the United States, and a resident of Croton Falls, in the county of Westchester and State of New York, have invented certain new and useful Improvements in Internal-Combustion Engines, of which the following is a specification.

The present invention relates generally to internal combustion engines, and has more particularly reference to two-cycle engines.

As is well known, great difficulty is encountered, in two-cycle engines, in preventing the products of combustion from mingling with the fuel. This is due to the inability to properly localize the fresh charge with respect to the ignition means, and because the charge is not admitted to the combustion chamber in such a way that the natural flow of the gases will result in a scavenging of the cylinder substantially without mingling the fuel and the products of combustion.

The mingling of the spent gases with the fresh charge results in a mixture of poor quality—at times so poor that an explosion will not take place. This defect is especially apparent when the engine is running at high speed under a light load. At such times the highest efficiency should be obtained by the use of a minimum charge. With the constructions now employed, however, the difficulty of localizing the charge increases with the diminution of the charge, and consequently it is not possible to obtain the requisite power without the use of an undue amount of fuel. This detracts materially from the efficiency of operation.

The main object of this invention is to overcome these difficulties, and to accomplish this by simple and inexpensive means.

Other objects will appear as the specification proceeds.

In accordance with the foregoing objects the invention consists of means for introducing fuel substantially at the end of the power stroke of the piston into one end of the combustion chamber at a point adjacent to the ignition means under sufficient compression and in a constantly widening stream from its point of admission, which stream by its expansion displaces the products of combustion *en masse* and insures its own localization adjacent to the ignition means on the compression stroke of the piston.

Treating the invention more specifically, the cylinder and the piston together form a combustion chamber which is characterized by an end portion of relatively small capacity which gradually widens in one direction and in which the fresh mixture is localized on the compression stroke, an ignition means in said end portion adjacent to which a minimum charge can be confined, together with means for admitting the charge under compression in substantially the narrowest part of said end portion.

The requisite compression may be obtained in any suitable manner but preferably, as here shown, a compression chamber is formed by the hollow piston, the cylinder and the crank casing, which serve to compress the charge within the compression chamber on the power stroke of the piston.

In the specific embodiment of the invention herein disclosed the end portion of small capacity which gradually widens in one direction is produced by providing the cylinder with a tapering portion running from the main portion of the cylinder to a supplemental extension of smaller diameter than the main portion and in providing the hollow piston with a hollow plunger suitably connected to said piston.

Also in the present embodiment of the invention the means for admitting the charge and for exhausting the products of combustion comprise valveless ports which are opened by the reciprocating movement of the piston in properly timed relation with respect to the other parts of the engine.

In the accompanying drawings the invention is disclosed in a concrete and preferred form but changes of construction may be made without departing from the legitimate and intended scope of the invention as expressed in the appended claims.

In the drawings:

Figure 1 is a vertical sectional view of a two-cycle engine embodying the invention, with the piston shown at the end of the compression stroke.

Fig. 2 is a view similar to Fig. 1 with the piston shown at the end of the power stroke.

Fig. 3 is a horizontal sectional view on the line 3—3 of Fig. 1.

Fig. 4 is a horizontal sectional view on the line 4—4 of Fig. 1.

Fig. 5 is a horizontal sectional view on the line 5—5 of Fig. 4.

Fig. 6 is a fragmentary detail view of the end portion of the combustion chamber showing the flow of the gases at the moment of admission of the charge.

Similar characters of reference indicate corresponding parts in the different views.

1 indicates the cylinder of the engine provided with a main portion 2 and with a supplemental hollow extension 3, there being a tapered portion 4 which connects the main portion of the cylinder and the supplemental hollow extension. At the lower end of the main portion 2 of the cylinder is the crank casing 5 which is, in the present instance, air tight. 6 indicates a hollow piston consisting of the main portion 7, a hollow plunger 8 and a suitable connecting portion 9, in the present instance of tapered formation, between the portions 7 and 8. The piston 6 is connected to the crank shaft 10 by means of the crank 11 and connecting rod 12 in the usual manner. 13 is the inlet. 14 is the exhaust port leading from the annular chamber 15 which communicates with the main portion of the cylinder by means of the ports 16 at the proper point in the cycle of the machine. 17 indicate ports in the hollow plunger establishing communication between the said hollow plunger and the cylinder. Adjacent to said ports 17 is the conical shaped fire-screen 18 which prevents explosion within the piston. 19 is the ignition means shown here as a spark plug of conventional type.

It will be noted particularly from Figs. 2 and 6 that the cylinder and the piston together form a combustion chamber having an end portion of relatively small capacity which gradually widens in one direction. In this end portion of the combustion chamber there is located the spark plug 19.

Now upon the power stroke of the piston the ports 16 are uncovered, thus permitting the products of combustion to escape therethrough and thence to the exhaust, and substantially at this time the ports 17 in the hollow plunger reach substantially the narrowest point of said end portion and permits the fresh charge to enter. Since the piston compresses the charge within the compression chamber, formed by the hollow piston, cylinder and crank casing, upon the power stroke, the fresh charge will enter through the ports 17 in a constantly widening stream, which stream by its expansion displaces the products of combustion *en masse* and substantially without mingling therewith and without trapping any of the products of combustion in the end portion of the combustion chamber. The result is that upon the compression stroke of the piston the fresh charge is localized in said end portion adjacent to the ignition means, thereby insuring an effective explosion and also admitting of a minimum charge being used when the engine is running at high speed.

In Fig. 6 the flow of the gases in the end portion has been illustrated, from which it will be seen that the fresh charge 20 enters the combustion chamber in a constantly widening stream and drives the spent gases 21 *en masse* in front of it.

I am familiar with the following patents and disclaim what is disclosed therein:
Burger, 585,651, July 6, 1897,
Woolery, 1,101,374, June 23, 1914,
Bissell, 871,319, Nov. 19, 1907,
Sintz, 592,669, Oct. 28, 1897,
Cole, 906,773, Dec. 15, 1908,
Eighmie, 1,076,877, Oct. 28, 1913,
Stahl, 950,162, Feb. 22, 1910,
Wolcott, 864,818, Sept. 3, 1907,
Radovanovic, 780,812, Jan. 24, 1906,
Heermans, 980,946, Jan. 10, 1911.

What I do claim is:

A two-cycle engine comprising: a cylinder and a piston forming a combustion chamber having an end portion of relatively small capacity which gradually widens in one direction from the point of admission and in which the fresh mixture is localized on the compression stroke, ignition means in said end portion adjacent to which a minimum charge can be confined, and a valveless port of substantially the same area as the small end portion of said combustion chamber, said port being controlled by the reciprocation of the piston for admitting the charge under compression into substantially the narrowest part of said end portion substantially upon the completion of the power stroke of the piston.

Signed at New York, in the county of New York and State of New York, this 11th day of March, A. D. 1915.

CHARLES A. JUENGST.

Witnesses:
AXEL V. BEEKEN,
TERESA V. LYNCH.